United States Patent [19]

Hayashi

[11] Patent Number: 5,569,518
[45] Date of Patent: Oct. 29, 1996

[54] GLASS SUBSTRATE FOR A MAGNETIC DISK WITH ROUGHENED EDGES

[75] Inventor: Ichiro Hayashi, Yokohama, Japan

[73] Assignee: AG Technology Co., Ltd., Yokohama, Japan

[21] Appl. No.: 271,628

[22] Filed: Jul. 7, 1994

[30] Foreign Application Priority Data

| Jul. 7, 1993 | [JP] | Japan | 5-192787 |
| Dec. 21, 1993 | [JP] | Japan | 5-322445 |

[51] Int. Cl.$^6$ .................................................. G11B 5/84
[52] U.S. Cl. .................. 428/141; 428/410; 428/338; 428/220; 428/64.1; 428/64.2; 428/64.3; 428/64.4; 428/65.3; 428/694 SG; 428/694 TR; 369/280; 360/135; 346/137
[58] Field of Search ............................. 428/141, 410, 428/338, 220, 64.1, 64.2, 64.3, 64.4, 65.3, 694 SG, 694 TR; 369/280; 360/135; 346/137

[56] References Cited

U.S. PATENT DOCUMENTS

| 5,080,948 | 1/1992 | Morita et al. | 428/64 |
| 5,087,481 | 2/1992 | Chen et al. | 428/129 |
| 5,094,898 | 3/1992 | Morita et al. | 428/64 |
| 5,116,658 | 5/1992 | Miyake | 428/141 |
| 5,128,922 | 7/1992 | Inui et al. | 369/280 |
| 5,268,071 | 7/1993 | Sono et al. | 156/663 |

*Primary Examiner*—William Watkins
*Attorney, Agent, or Firm*—Oblon, Spivak, McClelland, Maier & Neustadt, P.C.

[57] ABSTRACT

A glass substrate for a magnetic disk having an inner peripheral edge and an outer peripheral edge, wherein the surface of at least the inner peripheral edge is treated by etching to have a surface roughness such that, as measured by a three dimensional scanning electron microscope at randomly selected at least four places with a reference length of 240 μm and a cut-off wavelength of arithmetic mean roughness (Ra) of 80 μm, the mean value of arithmetic mean roughness (Ra) is from 1.0 to 6.0 μm, and the mean value of the number of peaks is within a range of from 8 to 30.

4 Claims, 6 Drawing Sheets

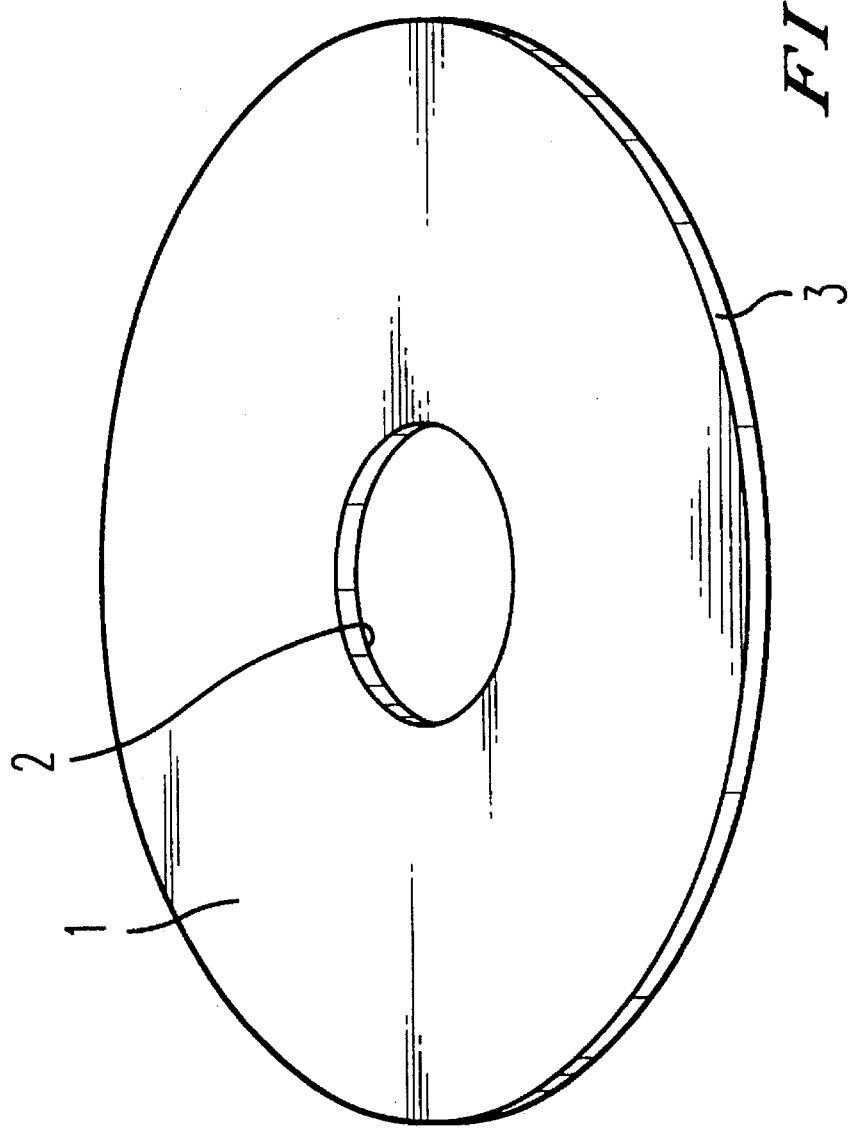

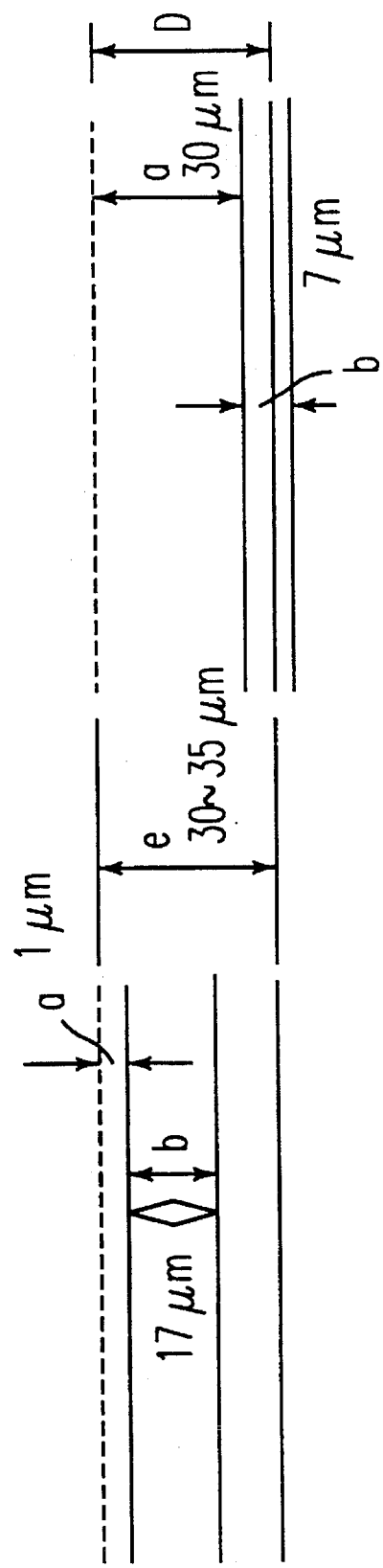

GLASS SUBSTRATE FOR A MAGNETIC DISK WITH ROUGHENED EDGES

BACKGROUND OF THE INVENTION

1. Field of the Invention

The present invention relates to a glass substrate of high strength for a magnetic disk and a process for its production.

2. Discussion of Background

Heretofore, aluminum alloy substrates have been used mainly as the substrates for magnetic disks to be used for magnetic disk memory devices. However, along with the demand for high density recording, an attention has been drawn to glass substrates which are materially hard as compared with aluminum alloy substrates and which are excellent in flatness and smoothness, and some of them have been practically used. However, glass substrates for magnetic disks which are made of glass as brittle material, have a problem that they are likely to break during their handling or during their use.

one of the factors governing the mechanical strength of a doughnut-shaped magnetic disk substrate made of glass, is flaws which are present on the surface of the inner peripheral edge of the substrate where the maximum tensile stress will form during the operation of the magnetic disk. Nevertheless, it is common that in the glass substrate for a magnetic disk, the surface roughness of the surfaces of the inner and outer peripheral edges (chamfer portions) is coarser than that of the finished main surface of the disk which is required to have extremely high levels of flatness and smoothness. The reason is simply that the inner and outer peripheral edge surfaces have no relation to magnetic recording, and they are curved surfaces which require costs for finishing treatment so high that the finishing treatment can not adequately be conducted.

On the other hand, in order to further improve the mechanical strength, it is common to reduce the depth of flaws on the inner and outer peripheral edge surfaces by conducting finish treatment of the inner and outer peripheral edge surfaces by means of abrasive particles having particle sizes finer than #500 mesh. Yet, there still remain considerably deep flaws on the inner and outer peripheral edge surfaces. To further improve the finish of the inner and outer peripheral edge surfaces, it is necessary to conduct multi-step processing using abrasive particles with their particle sizes stepwisely reduced. However, such multi-step treatment has had a problem of reducing the productivity to a large extent and substantially increasing the costs.

In the case of glass disks, it has been common, rather than improving the finish of the inner peripheral edge surface, to increase the strength by a chemical reinforcing method so-called an ion exchange reinforcing method, wherein glass is immersed in a molten potassium nitrate salt to ion exchange sodium ions on the glass surface with potassium ions of the molten potassium nitrate salt thereby to form a compression layer on the glass surface.

However, improvement of the strength by such chemical reinforcement is effective only for glass containing certain specific proportions of alkali metals such as sodium.

The depth of the surface compression stress layer introduced to the glass substrate surface by such a chemical reinforcing method and the level of the compression stress value, vary to some extent by such conditions as the temperature of the molten salt and the immersion time. However, they depend more largely on the composition of the glass itself rather than the temperature and the immersion time. Namely, in order to obtain a deep compression stress layer and to attain a high level of reinforcement, it is necessary to increase the proportions of alkali metal components such as sodium and lithium in the glass composition.

On the other hand, in a magnetic disk, an extremely thin metal or alloy magnetic layer is formed on the glass substrate. Therefore, there is a problem that as the alkali metal components such as sodium in the glass composition increase, such alkali metal components tend to substantially deteriorate the corrosion resistance of this magnetic layer. As a method for overcoming this problem, penetration of the alkali metal components into the magnetic layer can be prevented by forming an undercoat layer beneath this magnetic layer. However, in such a case, the undercoat layer is required to be sufficiently thick. Particularly in the case of glass containing a large amount of alkali metal components, the thickness of the undercoat layer is required to be sufficiently thick. Further, in the case of a doughnut-shaped glass substrate, it tends to be difficult to form such an undercoat layer with a sufficient thickness at the inner peripheral edge surface or at the outer peripheral edge surface, when it is formed by sputtering or vacuum deposition. Accordingly, corrosion of the magnetic layer is likely to form in the vicinity of the inner and outer peripheral edge surfaces. From the viewpoint of corrosion of the magnetic layer due to such alkali metal components, the durability of the magnetic disk is better as the proportion of alkali components in the substrate glass is small. On the other hand, if the proportion of alkali components is small, the depth of the surface compression stress layer of the glass substrate formed by ion exchange tends to be small, and it is likely to be less than the depth of flaws often present on the glass surface. Therefore, there have been drawbacks that the chemical reinforcing effect is small, and no adequate strength can be obtained.

As another characteristic of the glass substrate for a magnetic disk, the glass substrate is highly stiff and thus has an advantage that the plate thickness can be made thin. The trend for making the plate thickness thin has recently progressed rapidly, and it has already been started to use a glass substrate having a thickness of 0.381 mm, and such a thin glass substrate is believed to become the main commercial product.

When the plate thickness is thin, an excessively deep surface compression stress layer is likely to create a large tensile stress at the central portion in the thickness direction of the glass substrate and thus is likely to lead to deterioration of the strength.

On the other hand, etching treatment with hydrofluoric acid is widely known as a method for treating glass products in general. However, etching treatment with hydrofluoric acid has been considered to be not suitable for conventional glass substrates for magnetic disks and has not been practically employed. The reason is that excess etching treatment is likely to form undesirable high protrusions on the surface of the glass substrate for a magnetic disk. Namely, in a magnetic disk memory device, a magnetic head flies on the surface of a magnetic disk rotated at a high speed, at a height of from 250 to 500 Å from the surface. Therefore, the presence of protrusions formed by excess etching is likely to cause head crush, which in turn is likely to destroy the entire recording surface of the magnetic disk. Accordingly, the height of abnormal protrusions must be controlled to be not higher than 250 Å at the maximum.

It has been found that when the surface roughness of the inner and outer peripheral edge surfaces of a glass substrate for a magnetic disk obtained solely by conventional mechanical treatment by means of fixed and free abrasive particles, is measured by a three dimensional scanning electron microscope (SEM) (ESA-300, tradename: Erionix, manufactured by Erionix K.K., hereinafter sometimes referred to as SEM or Erionix) with a reference length of 240 μm, the mean value of Ra at randomly selected four places is from 0.1 to 0.8 μm, and the number of peaks is from 32 to 60, and the glass substrate for a magnetic disk having such surface roughness at the inner and outer peripheral edges has been found to have inadequate mechanical strength, as a test result.

SUMMARY OF THE INVENTION

It is an object of the present invention to provide a glass substrate of high strength for a magnetic disk which has the strength improved by controlling the surface roughness of the surface of the inner and/or outer peripheral edges of the above-mentioned doughnut-shaped or a disk-shaped glass substrate for a magnetic disk, and a process for its production.

The present invention has been made to solve the above-mentioned problems and provides a glass substrate for a magnetic disk having an inner peripheral edge and an outer peripheral edge, wherein the surface of at least the inner peripheral edge is treated by etching to have a surface roughness such that, as measured by a three dimensional scanning electron microscope at randomly selected at least four places with a reference length of 240 μm and a cut-off wavelength of arithmetic mean roughness (Ra) of 80 μm, the mean value of arithmetic mean roughness (Ra) is from 1.0 to 6.0 μm, and the mean value of the number of peaks is within a range of from 8 to 30.

Further, the present invention provides a process for producing a glass substrate of high strength for a magnetic disk, which comprises applying etching treatment to a glass substrate for a magnetic disk and then applying chemical reinforcing treatment thereto.

BRIEF DESCRIPTION OF THE DRAWINGS

FIG. 5 is a perspective view showing a doughnut-shaped glass substrate for a magnetic disk.

FIGS. 6(a) and 6(b) are diagrammatical views illustrating the relation between the total value D of the etching depth a from the glass surface and the thickness b of the compression stress layer by chemical reinforcement, and the maximum depth e of flaws present on the inner and outer peripheral edge surfaces of the disk substrate.

DETAILED DESCRIPTION OF THE PREFERRED EMBODIMENTS

Figure 1A:
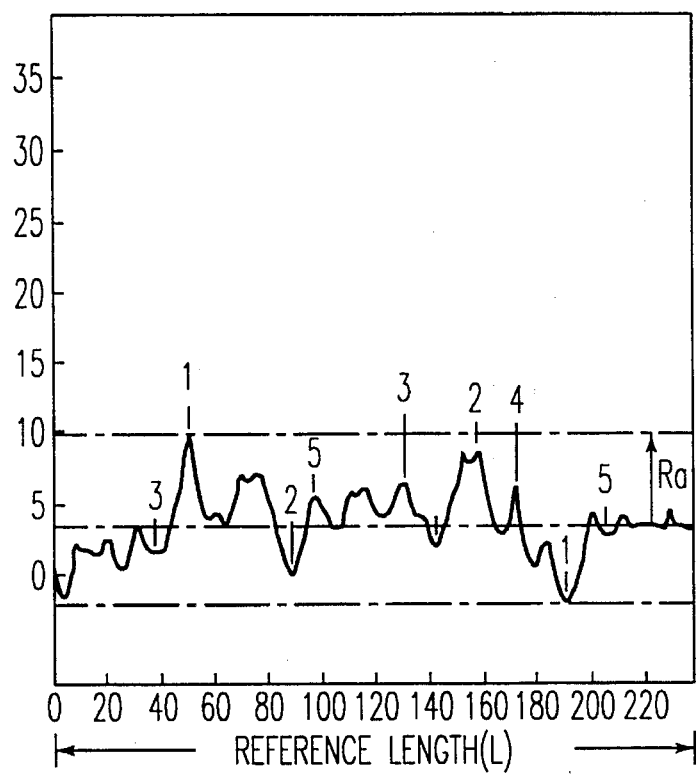
FIGS. 1A and 1B show roughness profile curves obtained by measuring by a three dimensional scanning electron microscope of the surface roughness of the inner peripheral edge surface of sample 1 obtained in Example 1.

In the present invention, the glass substrate for a magnetic disk is a disk-shaped, particularly a doughnut-shaped, glass substrate. In the case of the doughnut-shaped glass substrate, the roughness of the inner peripheral edge surface is required to be within the above defined range. Needless to say, however, it is preferred that the surface roughness of the outer peripheral edge surface is also within the above defined range. In the case of a disk-shaped substrate having no central opening, the roughness of the outer peripheral edge surface is required to be within the above defined range. FIG. 5 shows a perspective view of a doughnut-shaped glass substrate for a magnetic disk, wherein reference numeral 1 indicates such a doughnut-shaped glass substrate for a magnetic disk, numeral 2 indicates the inner peripheral edge surface, and numeral 3 indicates the outer peripheral edge surface.

The glass substrate for a magnetic disk according to the present invention is designed to improve the surface roughness of the inner and outer peripheral edge surfaces, which governs the bending strength of the glass substrate, particularly the surface roughness of the inner peripheral edge surface of the magnetic disk substrate, which substantially governs the mechanical strength, by etching the glass substrate with an etching solution such as hydrofluoric acid or fluorosulfuric acid and thereby to improve the bending strength of the glass substrate for a magnetic disk.

As mentioned above, a large factor governing the mechanical strength of the glass substrate for a magnetic disk, made of a brittle material such as glass, is flaws present at the inner periphery where the maximum tensile stress will be formed. The breaking strength can be improved by reducing the depth of such flaws. The depth of flaws can be reduced by etching treatment with an etching solution such as hydrofluoric acid or fluorosulfuric acid. Namely, by increasing the etching depth, the depth of flaws can be reduced. It is difficult to accurately measure the depth of flaws, but the change of the surface condition due to the increase of the etching depth can be grasped by a surface shape analyzer such as SEM. Further, if SEM is employed, the change of such a surface condition can be quantitatively represented by the surface roughness, and the number of peaks appearing on the cross sectional view.

Namely, the present invention has been made by measuring the roughness profiles of the inner and outer peripheral edge surfaces of a glass substrate for a magnetic disk by a three dimensional SEM, determining the roughness profile which is capable of presenting a glass substrate for a magnetic disk having practically adequate mechanical strength, and determining the optimum range of the surface roughness of the inner peripheral edge surface. The three dimensional SEM used in the present invention is a scanning electron microscope provided with two secondary electron detectors. For further information on the three dimensional measuring method by means of SEM, reference is made to "TRIBOLOGIST" Vol. 35, No. 11 (1990) 814–818 (Measurement of Microtopography-3-D Measuring SEM Method-by Yoshio Taguchi).

FIG. 1 is a roughness profile curve obtained by measuring by a three dimensional SEM the surface roughness of the inner peripheral edge surface of a doughnut-shaped glass substrate for a magnetic disk. In FIG. 1, the abscissa represents the measured length (μm) of the object to be measured, L represents the reference length, the ordinate represents the height and depth (μm) of the peaks and valleys of roughness, and Ra represents arithmetic mean roughness. This surface roughness is the one obtained from the roughness profile curve by a three dimensional SEM in accordance with the method stipulated in JIS B 0601 (1982) (see ISO R 468). This surface roughness was obtained as follows.

The reference length was 240 μm.

For Ra, the surface roughness was measured by SEM, and the numerical value as the obtained measured data, was used.

The Ra cut-off wavelength of 80 μm is to eliminate wavelength components of 80 μm or longer so that wariness of the substrate will not be counted as the surface roughness.

Ra at randomly selected at least four places is such that SEM measurements are carried out at four or more places randomly selected on the inner peripheral surface of a doughnut-shaped glass substrate for a magnetic disk to obtain Ra at the respective places, whereupon Ra values of the respective places are averaged to obtain a mean value.

The number of peaks is such that SEM measurements are carried out at four or more places randomly selected on the inner peripheral edge surface of a doughnut-shaped glass substrate for a magnetic disk, and the number of peaks at each place is counted from the obtained two dimensional roughness profile data, whereupon the numbers of peaks at the respective places are averaged to obtain a mean value.

For example, the case where Ra of the inner and outer peripheral edge surfaces of the glass substrate for a magnetic disk is lower than 1.0 μm and the mean value of the number of peaks is more than 30, corresponds to a state where the etching depth is extremely shallow or nil and indicates that flaws on the inner and outer peripheral edge surfaces are not removed or inadequately removed. In such a case, the desired mechanical strength can not be obtained. The mechanical strength tends to increase with an increase of the etching depth. However, if the etching depth increases so much that the mean value of the above-mentioned Ra is larger than 6.0 μm, the concentricity and circularity of the inner and outer peripheries tend to be poor. Accordingly, excess etching is not desirable, since the substrate is likely to depart from the dimensional standards for a magnetic disk. Presence of such protrusions is likely to cause magnetic head crush, which in turn causes breakage of the entire recording surface of the magnetic disk.

In the present invention, the mechanical strength can further be improved by applying treatment for reinforcing the glass substrate for a magnetic disk by ion exchange treatment, i.e. so-called chemical reinforcing treatment, to at least the inner peripheral edge surface of the above-mentioned glass substrate for a magnetic disk having an inner peripheral edge and an outer peripheral edge, wherein the surface of at least the inner peripheral edge has a surface roughness such that, as measured by a three dimensional SEM at randomly selected at least four places with a reference length of 240 μm and a Ra cut-off wavelength of 80 μm, the mean value of Ra is from 1.0 to 6.0 μm, and the mean value of the number of peaks is from 8 to 30.

The thickness of the surface stress layer introduced by such chemical reinforcement is preferably at least 3 μm with a view to improving the mechanical strength of the glass substrate for a magnetic disk.

Such a glass substrate of high strength for a magnetic disk can be obtained by applying etching treatment to a glass substrate for a magnetic disk and then applying chemical reinforcing treatment thereto.

For this chemical reinforcing treatment, it is common to employ a conventional method for chemical reinforcing treatment of glass, i.e. a method used for an ion exchange reinforcing method, such as a method wherein a glass substrate is immersed in a molten salt bath composed essentially of potassium nitrate salt heated to a high temperature at a level of from 400° to 500° C. and maintained therein for a period of from 0.5 to 12 hours so that sodium ions in the glass substrate surface are ion-exchanged with potassium ions of the potassium nitrate salt. However, it is also possible to employ a method of conducting ion exchange by means of other salts.

In the production of such a glass substrate of high strength for a magnetic disk, it is preferred that the total of the etching depth by the above-mentioned etching treatment and the depth of the surface stress layer obtained by the chemical reinforcing treatment, is adjusted to be larger than the depth of flaws present in the inner periphery of the disk.

Further, it is preferred to have finishing treatment applied to the inner and outer peripheral edge surfaces, particularly the inner peripheral edge surface, of the doughnut-shaped glass substrate for a magnetic disk by means of abrasive particles of from #200 to #1000 mesh, prior to the etching treatment of the glass substrate.

In the present invention, the etching method may be a wet etching method employing an etching solution as a common etching method for glass, or a dry etching method employing an etching gas. In particular, an etching solution such as a hydrofluoric acid solution, a fluorosulfuric acid solution or a hydrosilicofluoric acid solution may suitably be employed.

In a case where etching by an etching solution such as a hydrofluoric acid solution or a fluorosulfuric acid solution is thus conducted prior to the chemical reinforcing treatment, after the processing of a glass substrate into a doughnut-shape, the total value (hereinafter referred to as D) of the etching depth and the depth of the surface stress layer introduced by the chemical reinforcement, is preferably adjusted to be larger than the depth of flaws present on the inner and outer peripheral edge surfaces.

Namely, as shown in FIG. 6(a), the total value D of the depth from the glass surface removed by the etching treatment of the glass surface of the inner and outer peripheral edge surfaces of the disk substrate, i.e. the etching depth a, and the depth b of the compression stress layer formed by chemical reinforcement, is preferably adjusted to be larger than the maximum depth e of flaws present on the inner and outer peripheral edge surfaces of the disk substrate. FIG. 6(b) illustrates a case where the maximum depth of flaws is larger than the total value D of the etching depth a and the thickness h of the compression stress layer formed by chemical reinforcement. The depth of flaws is deeper than the thickness of the compression stress layer formed by chemical reinforcement, whereby the glass substrate is susceptible to breakage.

For example, it is preferred that the etching depth is within a range of from 5 to 55 μm, preferably from 10 to 30 μm, and the depth of the surface compression stress layer introduced by chemical reinforcement is within a range of from 5 to 25 μm. More specifically, the value D is preferably made larger than the average particle size of abrasive particles used for finishing treatment of the inner peripheral edge surface, preferably larger than the maximum particle size of the abrasive particles. The average particle size of such abrasive particles is preferably from about 80 to about 10 μm.

It is generally possible that flaws deeper than the maximum size of abrasive particles will form. Therefore, it is preferred to adjust the etching depth to be deeper than the maximum size of abrasive particles.

In the present invention, a lap process may be introduced wherein after the etching process, the main surface and the inner and outer peripheral edge surfaces of the glass substrates are polished by supplying abrasive particles to the metal level block, whereby it is possible to eliminate high protrusions formed on the main surface and the inner and outer peripheral edge surfaces of the glass substrate even when the etching degree is substantial.

By polishing the protrusions on the inner and outer peripheral edge surfaces by the lap polishing after the etching treatment, the above etching treatment can be conducted to such an extent that the etching depth is at least 10 μm, whereby it is possible to obtain a glass substrate of higher strength for a magnetic disk.

It is generally known that the virgin strength of glass itself is at a high level in the order of 100 kg/mm$^2$. In the present invention, it is intended to increase the strength of the glass substrate not only by the depth and the compression stress value of the stress layer formed by chemical reinforcement but also by paying a particular attention to flaws on the inner peripheral edge surface of the glass substrate which constitute a large factor of reducing the virgin strength and by reducing the flaws at the inner periphery to improve the strength. Namely, the depth of flaws formed on the glass substrate surface by etching treatment is made less than the depth of the surface compression stress layer, so that high strength of the glass substrate can be obtained even when the surface compression stress layer formed by chemical reinforcement is shallow. Thereby, the glass substrate surface has been made substantially free from flaws responsible for deterioration of the strength, and thus it has been made possible to improve the strength of the glass substrate.

A magnetic disk of a high strength glass can be obtained by forming a magnetic recording layer, with without an undercoating layer interposed, on the main surface of the glass substrate for a magnetic disk of the present invention having the prescribed mean value of Ra and the prescribed mean value of the number of peaks and, if necessary, by forming a protective layer or a lubricant layer thereon.

Now, the present invention will be described in further detail with reference to Examples. However, should be understood that the present invention is by no means restricted to such specific Examples.

EXAMPLE 1

Twenty sheets of a doughnut-shaped glass substrate for a magnetic disk made of soda lime glass containing about 13% of sodium and having an outer diameter of 48 mm, an inner diameter of 12 mm and a thickness of 0.381 mm, with required dimensional standards (dimensional precision) such that the concentricity of the inner and outer peripheries is not more than 50 μm and the circularity of the inner and outer peripheries is not more than 15 μm, were prepared. The inner and outer peripheral surfaces of each glass substrate were subjected to finishing treatment by means of abrasive particles of #500 mesh (30 to 35 μm). Then, the glass substrate was immersed in a fluorosulfuric acid solution containing hydrofluoric acid and sulfuric acid, and etching treatment was carried out to an etching depth of 5 μm. Then, the main surface of this glass substrate was subjected to lap polishing. A sample thus obtained is designated as sample No. 1. A sample obtained in the same manner by conducting the etching treatment to an etching depth of 15 μm is designated as sample No. 2. Likewise, a sample obtained in the same manner by conducting the etching treatment to an etching depth of 32.5 μm is designated as sample No. 3.

EXAMPLE 2

The glass substrate treated by etching to an etching depth of 15 μm an in Example 1, was immersed in a molten potassium nitrate salt at 450° C. for 8 hours for chemical reinforcing treatment. The depth of the surface compression layer of the glass substrate thus treated by chemical reinforcement was about 25 μm on average. A sample thus obtained is designated as sample No. 4. No change in the roughness profile was observed after the chemical reinforcing treatment.

EXAMPLE 3

Twenty sheets of a doughnut-shaped glass substrate for a magnetic disk made of low alkali glass containing about 5% of sodium and having an outer diameter of 48 mm, an inner diameter of 12 mm and a thickness of 0.381 mm, with required dimensional standards (dimensional precision) such that the concentricity of the inner and outer peripheries is not more than 50 μm and the circularity of the inner and outer peripheries is not more than 15 μm, were prepared.

The inner and outer peripheral edge surfaces of each glass substrate were subjected to finishing treatment by means of abrasive particles of #500 mesh. Then, this glass substrate was immersed in the same fluorosulfuric acid solution as used in Example 1 to conduct etching treatment to an etching depth of 40 μm. A sample thereby obtained is designated as sample No. 5.

EXAMPLE 4

The glass substrate treated by etching to an etching depth of 40 μm in Example 3, was immersed in a molten potassium nitrate salt at 450° C. for 8 hours in the same manner as in Example 1 to conduct chemical reinforcing treatment. The depth of the surface compression stress layer of the glass substrate obtained by this chemical reinforcing treatment was about 15 μm on average. This sample is designated as sample No. 6. After the chemical reinforcing treatment, the etching depth showed no change at 40 μm, and no change of the roughness profile was observed.

Comparative Example 1

Twenty sheets of a doughnut-shaped glass substrate for a magnetic disk made of soda lime glass containing about 13% of sodium and having an outer diameter of 48 mm, an inner diameter of 12 mm and a thickness of 0.381 mm, with required dimensional standards (dimensional precision) such that the concentricity of the inner and outer peripheries is not more than 50 μm and the circularity of the inner and outer peripheries is not more than 15 μm (the same substrates as in Example 1), were prepared.

The inner and outer peripheral edge surfaces of each glass substrate was subjected to finishing treatment by means of abrasive particles of #500 mesh to obtain a glass substrate for a magnetic disk. This sample is designated as sample No. 10.

Comparative Example 2

The glass substrate having the inner and outer peripheral edge surfaces treated for finishing by means of abrasive particles of #500 mesh, obtained by Comparative Example 1, was immersed in the same fluorosulfuric acid solution as used in Example 1, and etching treatment was conducted to an etching depth of 80 μm to obtain a glass substrate for a magnetic disk. This sample is designated as sample No. 11.

Comparative Example 3

The glass substrate having the inner and outer peripheral edge surfaces treated for finishing by means of abrasive particles of #500 mesh, obtained in Comparative Example 1, was immersed in a molten potassium nitrate salt at 450° C. for 8 hours in the same manner as in Example 2 to conduct chemical reinforcing treatment to obtain a glass substrate for a magnetic disk. This sample is designated as sample No. 12. The depth of the surface compression layer of this glass substrate treated for chemical reinforcement, was about 25 μm on average.

Comparative Example 4

The glass substrate having the inner and outer peripheral edge surfaces treated for finishing by means of abrasive particles of #500 mesh and then treated for etching to an etching depth of 80 μm, obtained in Example 2, was immersed in a molten potassium nitrate salt at 450° C. for 8 hours in the same manner as in Example 2 to conduct chemical reinforcing treatment to obtain a glass substrate for a magnetic disk. This sample is designated as sample No. 13. The depth of the surface compression layer of this glass substrate treated for chemical reinforcement, was about 25 μm on average.

EXAMPLE 5

With respect to sample Nos. 1 to 3 obtained in Example 1 and sample No. 10 obtained in Comparative Example 1, the surface roughness of the inner and outer peripheral edge surfaces was measured. For this measurement, a three dimensional SEM (ESA-300, "Erionix", tradename, manufactured by Erionix K.K.) was used, and the surface roughness was measured at four places per sheet of each sample under such conditions that the scanning distance was 240 μm, the cut-off wavelength of Ra was 80 μm, and the magnification was 500. The roughness profiles of these samples as measured by the three dimensional SEM are shown in FIGS. 1 to 4.

Figure 1B:
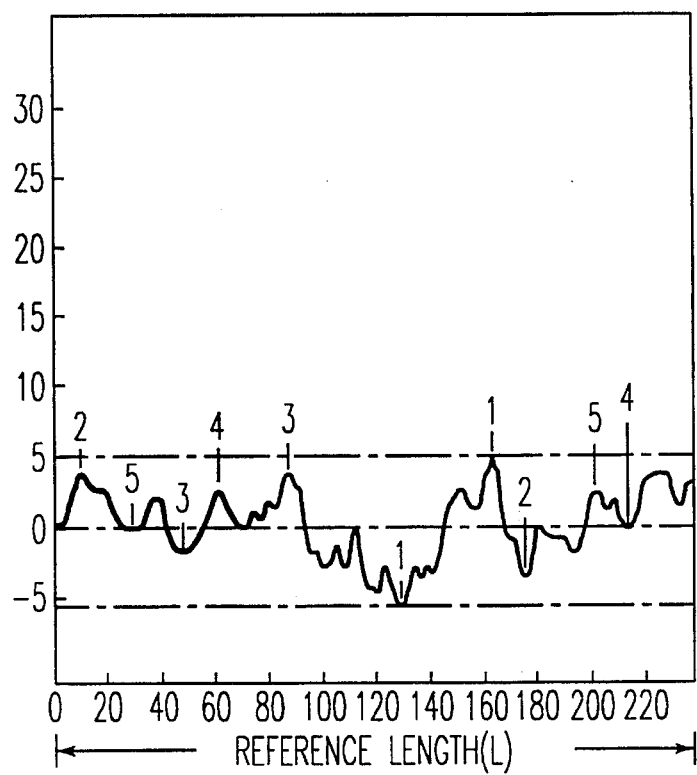

FIG. 1A and FIG. 1B show the roughness profile of the inner peripheral edge surface of the glass substrate for a magnetic disk of sample No. 1, whereby the mean value of Ra at the four places was 1.48 μm, and the mean value of the number of peaks was 28.

Figure 2A:
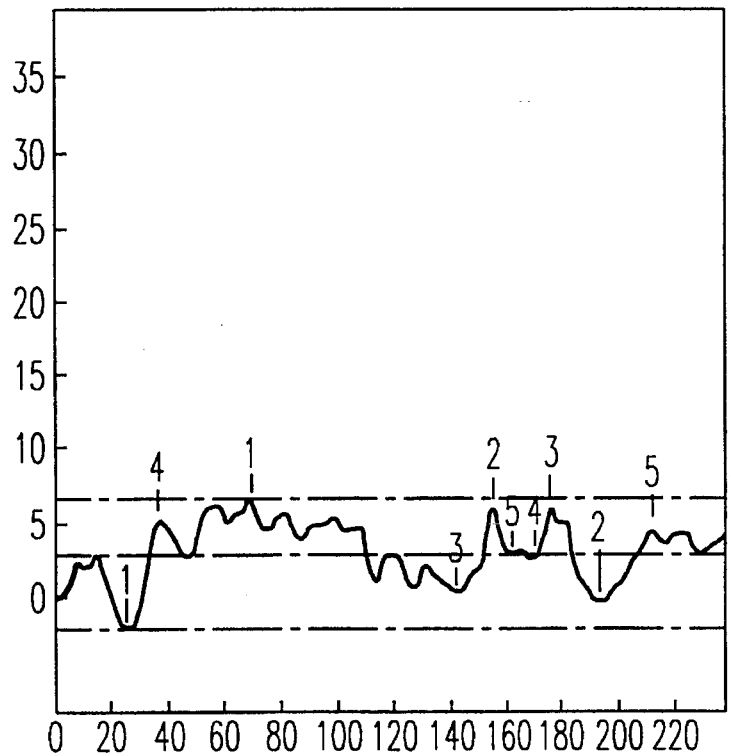
FIGS. 2A and 2B show roughness profile curves obtained by measuring by a three dimensional scanning electron microscope of the surface roughness of the inner peripheral edge surface of sample 2 obtained in Example 1.
Figure 2B:
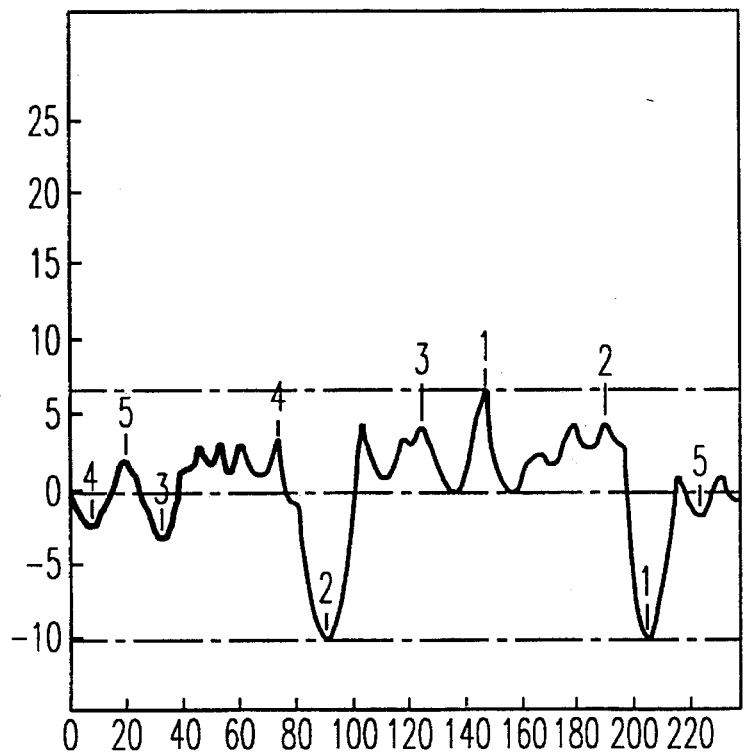

FIG. 2A and FIG. 2B show the roughness profile of the inner peripheral edge surface of the glass substrate for a magnetic disk of sample No. 2, whereby the mean value of Ra at the four places was 1.71 μm, and the mean value of the number of peaks was 20.

Figure 3A:
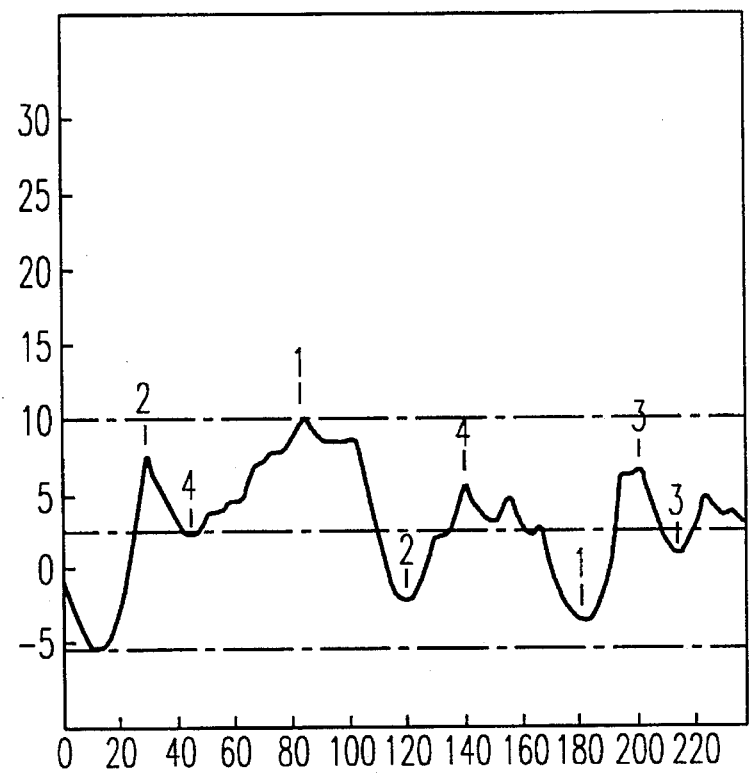
FIGS 3A and 3B show roughness profile curves obtained by measuring by a three dimensional scanning electron microscope of the surface roughness of the inner peripheral edge surface of sample 3, obtained in Example 1.
Figure 3B:
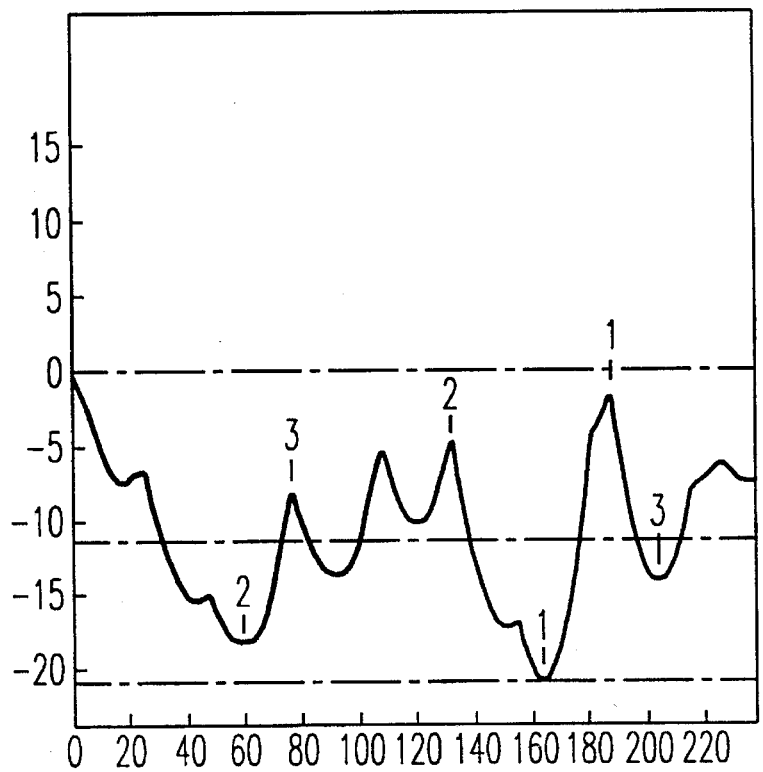

FIG. 3A and FIG. 3B show the roughness profile of the inner peripheral edge surface of the glass substrate for a magnetic disk of sample No. 3, whereby the mean value of Ra at the four places was 2.38 μm, and the mean value of the number of peaks was 14.

Figure 4A:
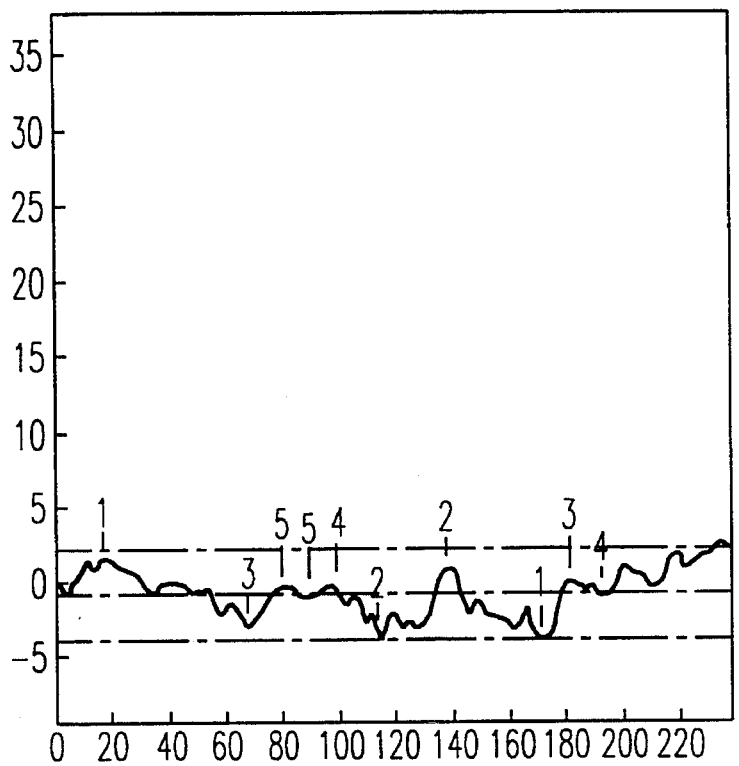
FIGS. 4A and 4B show roughness profile curves obtained by measuring by a three dimensional scanning electron microscope, the surface roughness of the inner peripheral edge surface of sample 10 obtained in Comparative Example 1.
Figure 4B:
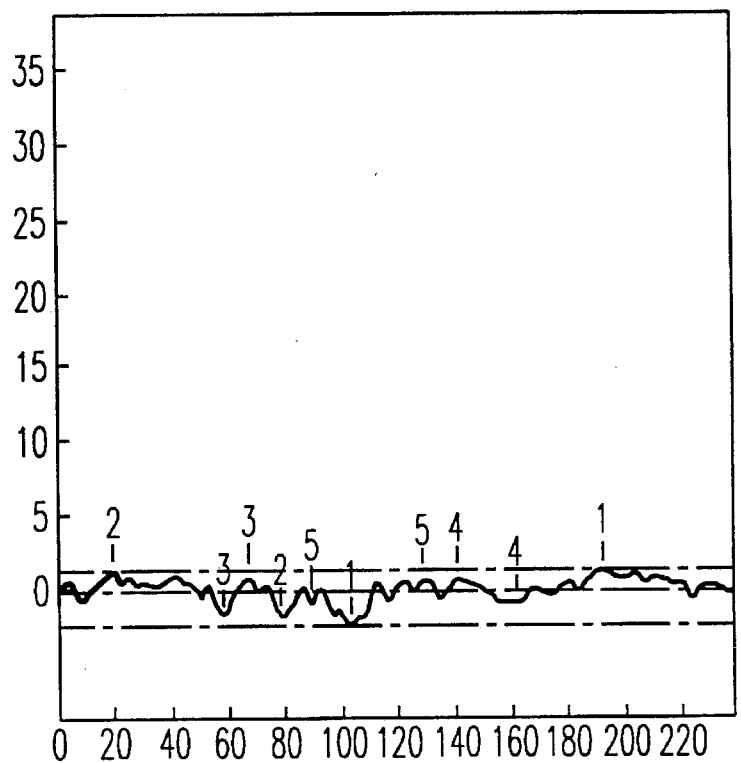

FIG. 4A and FIG. 4B show the roughness profile of the inner peripheral edge surface of the glass substrate for a magnetic disk of sample No. 10 of Comparative Example 1, whereby the mean value of Ra at the four places was 0.74 μm, and the mean value of the number of peaks was 41.

Comparative Example 5

Twenty sheets of a doughnut-shaped glass substrate for a magnetic disk made of low alkali glass containing about 5% of sodium and having an outer diameter of 48 mm, an inner diameter of 12 mm and a thickness of 0.381 mm, with required dimensional standards (dimensional precision) such that the concentricity of the inner and outer peripheries is not more than 50 μm, and the circularity of the inner and outer peripheries is not more than 15 μm (the same substrate as in Example 3), were prepared.

The inner and outer peripheral edge surfaces of each glass substrate were treated for finishing by means of abrasive particles of #500 mesh to obtain a glass substrate for a magnetic disk. This sample is designated as sample No. 14.

Comparative Example 6

The glass substrate having the inner and outer peripheral edge surfaces treated for finishing by means of abrasive particles of #500 mesh, obtained in Comparative Example 5, was immersed in the same fluorosulfuric acid solution as used in Example 1 to conduct etching treatment to an etching depth of 70 μm to obtain a glass substrate for a magnetic disk. This sample is designated as sample No. 15.

Comparative Example 7

The glass substrate having the inner and outer peripheral edge surfaces treated for finishing by means of abrasive particles of #500 mesh, obtained in Comparative Example 5, was immersed in a molten potassium nitrate salt at 450° C. for 8 hours in the same manner as in Example 2 to conduct chemical reinforcing treatment to obtain a glass substrate for a magnetic disk. This sample is designated as sample No. 16. The depth of the surface compression layer of this glass substrate treated for chemical reinforcement, was about 15 μm on average.

Comparative Example 8

The glass substrate having the inner and outer peripheral edge surfaces treated for finishing by means of abrasive particles of #500 and then treated for etching to an etching depth of 70 μm, obtained in Comparative Example 6, was immersed in a molten potassium nitrate salt at 450° C. for 8 hours in the same manner as in Example 2 to conduct chemical reinforcing treatment to obtain a glass substrate for a magnetic disk. This sample is designated as sample No. 17. The depth of the surface compression layer of this glass substrate treated for chemical reinforcement, was about 15 μm on average.

EXAMPLE 6

With respect to sample Nos. 2, 4, 5 and 6 obtained in Examples 1 to 4 and sample Nos. 10 to 13 obtained in Comparative Examples 1 to 4, the bending strength (breaking strength), the circularity of the outer periphery, the circularity of the inner periphery and the concentricity of the outer and inner peripheries were measured, and the results are shown in Table 1. Further, the surface roughness of the inner peripheral edge surface and the number of peaks as measured in Example 5 are also shown in Table 1.

The above bending strength was measured in such a manner that the outer periphery of the doughnut-shaped glass substrate for a magnetic disk was freely supported in a circular ring frame, and a cross head as a load was pushed into the inner peripheral portion of the inner opening at a cross head speed of 10 mm/min, whereby the load at the time of breakage of the glass substrate was measured, and the bending strength was obtained from this value. The bending strength was represented by a mean value of the results obtained by measuring twenty sheets of each sample.

It is evident from the data in Table 1 that the sample of Example 1 is superior to the sample of Comparative Example 1, and the sample of Example 3 is superior to the sample of Comparative Example 5, in the bending strength, and their dimensional precision meets the prescribed standards. In Table 1, symbol * indicates that the dimensional precision for the circularity of the inner and outer peripheries is not satisfied.

polished by lap polishing, and then chemical reinforcing treatment was conducted in the same manner as in Example 1. This sample is designated as sample No. 7. Since low alkali glass was used, the depth of the surface compression stress layer formed by chemical reinforcement was 15 μm.

Comparative Example 9

Polishing and chemical reinforcing treatment were conducted in the same manner as in Example 7 except that no etching treatment was conducted, to obtain sample No. 18.

EXAMPLE 8

With respect to sample No. 7 of Example 7 and sample No. 18 of Comparative Example 9, the bending strength was obtained in the same manner as in the above-mentioned bending strength test, and the results are shown in Table 2. As is apparent from this Table, with sample No. 7, the mean value of the bending strength by the etching treatment to a

TABLE 1

| | | Inner peripheral edge surface | | | Circularity of the outer periphery (μm) | Circularity of the inner periphery (μm) | Concentricity (μm) |
|---|---|---|---|---|---|---|---|
| | Samples (preparation method) | Surface roughness Ra (μm) | Number of peaks | Bending strength (kg/mm$^2$) | | | |
| | | Soda lime glass | | | | | |
| Comparative Example 1 | Sample No. 10: Finishing treatment with #500 abrasive particles only. | 0.74 | 41 | 12 | 2.7 | 3.0 | 3.8 |
| Comparative Example 2 | Sample No. 11: Sample No. 10 was subjected to etching treatment to 80 μm. | 8.31 | 6 | 58 | 21.1* | 17.4* | 9.8 |
| Comparative Example 3 | Sample No. 12: Sample No. 10 was subjected to chemical reinforcing treatment. | 0.74 | 41 | 42 | | | |
| Comparative Example 4 | Sample No. 13: Sample No. 11 was subjected to chemical reinforcing treatment. | 8.31 | 6 | 78 | | | |
| Example 1 | Sample No. 2: Sample No. 10 was subjected to etching treatment to 15 μm. | 1.71 | 20 | 45 | 3.3 | 5.1 | 4.3 |
| Example 2 | Sample No. 4: Sample No. 2 was subjected to chemical reinforcing treatment. | 1.71 | 20 | 71 | 3.3 | 5.1 | 4.3 |
| | | Low alkali glass | | | | | |
| Comparative Example 5 | Sample No. 14: Finishing treatment with #500 abrasive particles only. | 0.34 | 34 | 15 | 3.2 | 2.9 | 3.5 |
| Comparative Example 6 | Sample No. 15: Sample No. 14 was subjected to etching treatment to 70 μm. | 8.02 | 7 | 56 | 20.8* | 18.1* | 8.1 |
| Comparative Example 7 | Sample No. 16: Sample No. 14 was subjected to chemical reinforcing treatment. | 0.34 | 34 | 38 | | | |
| Comparative Example 8 | Sample No. 17: Sample No. 15 was subjected to chemical reinforcing treatment. | 8.02 | 7 | 74 | | | |
| Example 3 | Sample No. 5: Sample No. 14 was subjected to etching treatment to 40 μm. | 3.05 | 12 | 52 | 8.0 | 10.1 | 5.4 |
| Example 4 | Sample No. 6: Sample No. 6 was subjected to chemical reinforcing treatment. | 3.05 | 12 | 72 | 8.0 | 10.1 | 5.4 |

EXAMPLE 7

A doughnut-shaped glass substrate made of low alkali glass containing about 5% of sodium was prepared (the outer diameter, the inner diameter, the thickness and the dimensional standards are the same as in Example 1). The inner and outer peripheral edge surfaces were subjected to finishing treatment with abrasive particles of 500 mesh (particle size: 30 to 35 μm). This glass substrate was immersed in the same fluorosulfuric acid solution as used in Example 1 to conduct etching treatment to an etching depth of 30 μm. Then, the main surface of the glass substrate was depth of 30 μm, was at least twice the value of sample No. 18 of Comparative Example 9. Further, the minimum value of the bending strength of sample No. 7 of Example 7 was larger than the maximum value of the bending strength of sample No. 18 of Comparative Example 9. This shows a remarkable improvement from the viewpoint of reliability.

TABLE 2

|  | Sample No. 7 (Example 7) | Sample No. 18 (Comparative Example 9) |
| --- | --- | --- |
| Etching depth | 30 μm | 0 μm |
| Bending strength |  |  |
| Mean value | 81 kg/mm² | 27 kg/mm² |
| Maximum value | 119 kg/mm² | 35 kg/mm² |
| Minimum value | 52 kg/mm² | 18 kg/mm² |
| Number of tested substrates | 20 | 5 |

As shown above, etching which used to be limited to a depth of about 5 μm, has now been made possible to a depth of 10 μm or more by conducting removal of abnormal protrusions on the inner and outer peripheral edge surfaces by lap polishing after etching, whereby it has been made possible to obtain a glass substrate of higher strength for a magnetic disk.

EXAMPLE 9

The same glass substrate as used in Example 7 was prepared, and the inner and outer peripheral edge surfaces of this glass substrate were subjected to finishing treatment with abrasive particles of 500 mesh (particle size: 30 to 35 μm). Using the same etching solution as used in Example 2, etching treatment was conducted to obtain sample Nos. 8a to 8d having etching depths of 15 μm, 25 μm, 35 μm and 45 μm, respectively. With respect to these samples, chemical reinforcing treatment was conducted in the same manner as in Example 1. These sample Nos. 8a to 8d and sample No. 18 obtained in Comparative Example 9 were subjected to the above-mentioned bending strength test, and the results are shown in Table 3.

As is apparent from this Table, the bending strength tends to increase with an increase of the etching depth, and with each sample obtained in Example 9, the bending strength was superior to the strength of the sample obtained in Comparative Example 9.

TABLE 3

|  | Sample Nos. 8a to 8d (Example) | | | | Sample No. 18 (Comparative Example) |
| --- | --- | --- | --- | --- | --- |
| Etching depth (μm) | 15 | 25 | 35 | 45 | 0 |
| Bending strength (kg/mm²) |  |  |  |  |  |
| Mean value | 42 | 83 | 86 | 90 | 27 |
| Maximum value | 53 | 92 | 94 | 105 | 35 |
| Minimum value | 29 | 60 | 75 | 75 | 18 |
| Number of tested substrates | 5 | 5 | 5 | 5 | 5 |
| Surface roughness (Ra) (μm) | 1.51 | 2.12 | 2.64 | 3.11 | 0.82 |
| Number of peaks | 25 | 17 | 12 | 10 | 36 |

EXAMPLE 10

With respect to sample Nos. 9a to 9d which were the same samples as in Example 9 except that no chemical reinforcing treatment was applied, the etching depth and the bending strength of the glass substrate were measured, and the results are shown in Table 4. The method for the bending strength test was the same as the above-mentioned method. The results show that the strength was at least twice the strength of the sample of Comparative Example 9, and thus indicates a remarkable improvement in the strength.

Namely, if the etching depth is at least 15 μm, flaws present on the glass substrate surface can substantially be reduced, whereby deterioration in the strength by flaws can substantially be reduced, and consequently, it is possible to increase the breaking strength of the glass substrate. If the etching depth is made deeper, abnormal protrusions are likely to result, but such protrusions may be removed by lap polishing, so that the glass substrate can be used as a substrate for a magnetic disk.

TABLE 4

|  | Sample Nos. 9a to 9d (Example) | | | | Sample No. 18 (Comparative Example) |
| --- | --- | --- | --- | --- | --- |
| Etching depth (μm) | 15 | 25 | 35 | 45 | 0 |
| Bending strength (kg/mm²) |  |  |  |  |  |
| Mean value | 43 | 29 | 46 | 47 | 17 |
| Maximum value | 46 | 34 | 57 | 64 | 23 |
| Minimum value | 40 | 26 | 27 | 22 | 8 |
| Number of tested substrates | 3 | 3 | 3 | 3 | 5 |

According to the present invention, without applying chemical reinforcing treatment to a doughnut-shaped glass substrate, it is possible to provide a glass substrate for a magnetic disk having high mechanical strength by applying etching treatment to the glass substrate so that the inner and outer peripheral edge surfaces, particularly the inner peripheral edge surface, of the glass surface will have surface roughness having a predetermined roughness profile.

Accordingly, the effects for improving the strength can be obtained not only with respect to a glass substrate containing a predetermined proportion of an alkali component such as sodium but also with respect to a low alkali glass substrate or a non-alkali glass substrate containing no sodium for which chemical reinforcing treatment is impossible. The present invention is effective for reducing costs, since strength can be improved without applying chemical reinforcing treatment. Further, the present invention may be applicable also to crystallized glass substrates or glass ceramics substrates, and effects for improving their strength can be expected.

Further, according to the present invention, it is possible to provide a glass substrate having higher mechanical strength for a magnetic disk by further subjecting the doughnut-shaped glass substrate having surface roughness with a prescribed roughness profile on the inner and outer peripheral edge surfaces to chemical reinforcing treatment.

Namely, according to the present invention, a glass substrate having higher mechanical strength for a magnetic disk can be obtained by the combination of the accomplishment of surface roughness with a prescribed roughness profile on the inner and outer peripheral edge surfaces of a doughnut-shaped glass substrate and the chemical reinforcing treatment of the glass substrate, whereby the following merits can further be obtained.

1. In order to deepen the surface stress layer by chemical reinforcement in order to improve the mechanical strength of glass, it used to be necessary to use glass having a high content of an alkali component such as sodium. On the other hand, in order to obtain high corrosion resistance required for a magnetic disk, it is necessary to use low alkali glass having a low content of sodium. However, according to the present invention, high mechanical strength can be obtained even with low alkali glass, and it is possible to obtain strength equal to readily reinforcible glass by a conventional process. Accordingly, when a magnetic disk is produced by using such a glass substrate and by forming a predetermined undercoating layer, a magnetic recording layer, a protective layer, a lubricant layer, etc. thereon, it is possible to obtain a magnetic disk having very high mechanical strength.

2. By using low alkali glass for the glass substrate for a magnetic disk, it is possible to prevent deterioration of the magnetic recording layer by an alkali component, and high corrosion resistance can be attained for a magnetic disk.

3. In order to increase the mechanical strength of a doughnut-shaped glass substrate for a magnetic disk, it is necessary to improve the surface roughness of the inner periphery governing the strength. Pot this purpose, multi-step treatment used to be required wherein the particle size of abrasive particles is sequentially reduced. This used to bring about substantial adverse effects to the productivity and the costs. However, in the present invention, it is possible to obtain a glass substrate having high mechanical strength without necessity of such multi-step treatment, by a combination of the formation of surface roughness with a prescribed roughness profile on the inner and outer peripheral edge surfaces and the Chemical reinforcing treatment as mentioned above.

4. Shortening of the time for chemical reinforcement of the glass substrate

According to the present invention, the strength can be increased by controlling the surface roughness of the inner and outer peripheral edge surfaces, whereby it is possible to reduce the thickness of the layer reinforced by ion exchange. It is thereby possible to obtain a glass substrate having high strength even by chemical reinforcing treatment for a shorter period of time as compared with the conventional treatment, whereby it is possible to reduce the costs.

5. Prevention of cracking during polishing of the glass substrate

According to the present invention, flaws on the inner peripheral edge surface, which governs the strength of a doughnut-shaped glass substrate, are removed or reduced by etching treatment, and the inner and outer peripheral edge surfaces are treated to have prescribed surface roughness, whereby the strength of the glass substrate itself is improved. Consequently, when this glass substrate is subjected to polishing, the cracking ratio of such a glass substrate during the polishing operation can substantially be reduced.

6. Shortening of the beveling tact of the inner and outer peripheries and improvement of the yield Improvement of the strength can be accomplished by attaining the prescribed surface roughness on the inner and outer peripheral edge surfaces by etching treatment of the inner and outer peripheral edge surfaces of a doughnut-shaped glass substrate, and the degree of importance of the processing precision for the beveling of the inner and outer peripheries of the doughnut-shaped glass substrate has been reduced. Accordingly, the processing speed for beveling the inner and outer peripheries can be improved. Further, by the etching treatment of the inner and outer peripheral edge surfaces, defects such as shipping and flaws can simultaneously be removed or reduced, whereby the yield for finishing treatment of the inner and outer peripheries can be substantially improved.

7. The present invention is not limited to the glass substrate for a magnetic disk and may commonly be applied to glass products, whereby improvement of strength can be expected.

What is claimed is:

1. A glass substrate for a magnetic disk having an inner peripheral edge and an outer peripheral edge, wherein the surface of at least the inner peripheral edge is treated by etching to have a surface roughness such that, as measured by a three dimensional scanning electron microscope at randomly selected at least four places with a reference length of 240 µm and a cut-off wavelength of arithmetic mean roughness (Ra) of 80 µm, the mean value of arithmetic mean roughness (Ra) is from 1.0 to 6.0 µm, and the mean value of the number of peaks is within a range of from 8 to 30.

2. The glass substrate for a magnetic disk according to claim 1, wherein the surface roughness of the surfaces of both the inner and outer peripheral edges is within the range as defined in claim 1.

3. The glass substrate for a magnetic disk according to claim 1, wherein the surface of at least the inner peripheral edge is treated by chemical reinforcing treatment.

4. A magnetic disk having a magnetic recording layer formed on the glass substrate for a magnetic disk, as defined in claim 1.

* * * * *